(12) United States Patent
Jeon et al.

(10) Patent No.: US 11,434,570 B2
(45) Date of Patent: Sep. 6, 2022

(54) COATING METHOD OF APATITE USING LASER

(71) Applicant: KOREA INSTITUTE OF SCIENCE AND TECHNOLOGY, Seoul (KR)

(72) Inventors: Hojeong Jeon, Seoul (KR); Seung Hoon Um, Seoul (KR); Jae Ho Park, Seoul (KR); Justin Jihong Chung, Seoul (KR); Hyunseon Seo, Seoul (KR); Hyung-Seop Han, Seoul (KR); Yu Chan Kim, Seoul (KR); Myoung-Ryul Ok, Seoul (KR); Hyun Kwang Seok, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/338,110

(22) Filed: Jun. 3, 2021

(65) Prior Publication Data
US 2021/0381112 A1 Dec. 9, 2021

(30) Foreign Application Priority Data
Jun. 5, 2020 (KR) .................. 10-2020-0068227

(51) Int. Cl.
C23C 26/00 (2006.01)
B23K 26/352 (2014.01)
B23K 26/122 (2014.01)
C01B 25/32 (2006.01)

(52) U.S. Cl.
CPC ............ *C23C 26/00* (2013.01); *B23K 26/122* (2013.01); *B23K 26/352* (2015.10); *C01B 25/32* (2013.01)

(58) Field of Classification Search
CPC .... C23C 26/00; B23K 26/352; B23K 26/122; C01B 25/32
See application file for complete search history.

(56) References Cited

U.S. PATENT DOCUMENTS

2020/0071834 A1\* 3/2020 Jeon .................. C23C 22/78

FOREIGN PATENT DOCUMENTS

| JP | 2012-030993 A | | 2/2012 |
|---|---|---|---|
| JP | 2012030993 A | \* | 2/2012 |
| JP | 2012030993 A | | 2/2012 |
| KR | 1020200026475 A | | 3/2020 |

OTHER PUBLICATIONS

Machine Translation of JP2012030993A. (Year: 2012).\*

\* cited by examiner

*Primary Examiner* — Michael P Wieczorek
(74) *Attorney, Agent, or Firm* — Rabin & Berdo, P.C.

(57) ABSTRACT

Provided is a method of forming an apatite coating, the method including immersing a substrate in an apatite-forming precursor solution including $Ca^{2+}$ ions and $PO_4^{3-}$ ions, emitting a laser beam onto a surface of the substrate immersed in the precursor solution, and forming an apatite coating in a region exposed to the laser beam, wherein an output power of the laser beam is set within a range enabling the surface of the substrate to be melted.

11 Claims, 13 Drawing Sheets

COATING METHOD OF APATITE USING
LASER

CROSS-REFERENCE TO RELATED APPLICATION

This application claims the benefit of Korean Patent Application No. 10-2020-0068227, filed on Jun. 5, 2020, in the Korean Intellectual Property Office, the disclosure of which is incorporated herein in its entirety by reference.

BACKGROUND

1. Field

The present invention relates to a method of forming an apatite coating using a laser, and more particularly, to a method of forming an apatite coating, the method including immersing a substrate in a precursor solution containing $Ca^{2+}$ ions and $PO_4^{3+}$ ions and emitting a laser beam to the substrate.

2. Description of the Related Art

Titanium-based alloys that are the most widely used as metallic biomaterials for medical purposes are reported as superior materials to conventional biometals due to low modulus of elasticity, excellent biocompatibility, and high corrosion resistance. However, bioinert titanium-based alloys cannot directly induce osteogenesis and require a long treatment time to bond to adjacent bones, and a spontaneously generated titanium oxide coating is too thin and rapidly disappears, failing to induce regeneration of adjacent bone tissue.

Thus, bioactivity is imparted to an implant by surface treatment to solve problems as described above such as direct bonding failure between the implant and bones and relaxation for reducing an implant-bond integration time. The bioactivity of titanium, used as a main material for implants, is further improved by physical or chemical surface treatment, thereby reducing a healing time after an implant is introduced into a human body, and research has been conducted into more effective surface treatment.

In this regard, hydroxyapatite has been used as a material applied to the surface of titanium for the surface treatment. Hydroxyapatite is a basic component constituting hard tissue of the human body and has been used as a bone graft material or a bone regeneration material. Hydroxyapatite with a chemical structure of Ca10(PO4)6(OH)2 is distributed in dental enamel of the human body mainly in the outermost enamel layer having a thickness of 1 to 2 mm. Hydroxyapatite is known to have a remineralization effect by directly filling up micropores of demineralized enamel.

Various methods such as anodizing, sol-gel method, plasma spraying, chemical vapor deposition (CVD), and plasma electrolytic oxidation (PEO) have been used to form a hydroxyapatite coating on the surface of a substrate such as titanium by surface treatment.

First, the anodizing is a method of forming a relatively thick layer of an oxide and a metal salt on the surface of a metal using an external power source. A metal, an oxide layer of which is to be formed, is installed at an anode, and another insoluble metal is brought into contact with a cathode to allow a current to flow in an electrolyte. By flowing a current for anodizing, a thin film of an hydroxide of the metal is formed at a very low voltage, and a metal oxide layer is formed at a voltage of about 10 V. However, once the oxide layer is formed, resistance increases causing concentration of an internal stress in the metal oxide layer, and the oxide layer is destroyed at 70 V. When the voltage is increased again, a second porous oxide layer is formed and sparks may occur during this process. Since the oxide layer is formed by forcibly applying electricity thereto, electrical efficiency may decrease and a local area where the sparks occur receives thermal stress to deteriorate physical properties of titanium and decrease adhesion, thereby deteriorating final physical properties thereof.

The sol-gel method is a method of preparing a solution that is converted into a gel by hydrolysis or polymerization using alcohol, water, acid, and the like to form a coating film. A homogenized solution is applied to a substrate in a state with a relatively low viscosity and converted into a gel to form a film on the substrate. A wet coating method such as dip-coating, which is an application of the sol-gel method, is a low temperature process and has advantages of forming a coating layer regardless of an area and controlling a thickness or a microstructure of the coating layer. However, there may be disadvantages of requirement of additional post-heat treatment for crystallization, limited formation of a flat coating, and requirement of an adhesive inserted into an intermediate layer to obtain a sufficient binding force between the coating and the substrate.

The plasma spraying, a thermal spraying method, is a process of depositing a metallic material and a nonmetallic material, such as ceramic, having a high melting point on a substrate in a molten or semi-molten state. Although plasma spraying is advantageous in that the material and the size of the substrate are not limited without causing deformation in the substrate, this method is applicable in the field, a thick coating may be formed, the thickness of a coating is easily controlled, and various types of coating materials may be used, it is difficult to apply plasma spraying to implants since a coating layer has a porosity of 0.6 to 15%, a ceramic coating layer formed on titanium by mechanical bonding instead of metallic bonding is weak against impact, and adhesion between the coating layer and the substrate is weak.

The plasma electrolytic oxidation (PEO) is a surface treatment process of forming a dense coating layer with excellent mechanical stability by inducing microdischarge on the surface of a metallic material immersed in an electrolyte. Properties of the coating layer formed by the PEO are controlled by various process parameters including the electrolyte. Particularly, electrolyte conditions and current density are the most important factors affecting formation and physical properties of the coating layer in titanium and titanium alloys. The electrolyte generally used in this case is potassium phosphate, sodium phosphate, glycerol phosphate, and tartaric acid salts. Although such additives generally facilitate the plasma electrolytic oxidation process by increasing electrical conductivity and the pH, the additives may react with hydroxyapatite to lower purity and form another compound. Therefore, there are problems of a low crystallinity of hydroxyapatite on the surface of an implant and a low hydroxyapatite content in the coating layer.

RELATED ART DOCUMENT

Patent Document (Patent Document 1) Japan Patent Laid-open Publication No. 2012-030993

SUMMARY

The present invention has been proposed to solve the above problems, and an object of the present invention is to provide a method of forming an apatite coating by emitting a laser beam onto a surface of a substrate immersed in a precursor solution.

However, these problems are exemplary, and the scope of the present invention is not limited thereby.

Additional aspects will be set forth in part in the description which follows and, in part, will be apparent from the description, or may be learned by practice of the presented embodiments.

According to an aspect of the present invention, provided is a method of forming an apatite coating including: (a) immersing a substrate in an apatite-forming precursor solution including $Ca^{2+}$ ions and $PO_4^{3-}$ ions; (b) emitting a laser beam onto a surface of the substrate immersed in the precursor solution; and (c) forming an apatite coating in a region exposed to the laser beam, wherein an output power of the laser beam is set within a range enabling the surface of the substrate to be melted.

In an embodiment of the present invention, the method may further include (d) removing the precursor solution and then removing a part of the apatite coating by emitting a laser beam to the region where the apatite coating is formed after step (c).

In an embodiment of the present invention, the substrate may include at least one material selected from the group consisting of a metal, a ceramic, a polymer, and a combination thereof.

In an embodiment of the present invention, the metal may include one selected from the group consisting of titanium (Ti), a Ti alloy, magnesium (Mg), a Mg alloy, stainless steel, and a cobalt (Co)-chromium (Cr) alloy.

In an embodiment of the present invention, the polymer may include one selected from the group consisting of polylactic acids (PLA), polyglycolic acid (PGA), poly D-lactic acid (PLDA), polyetheretherketone (PEEK), polycaprolactone (PCL), and ultra-high molecular weight polyethylene (UHMWPE).

In an embodiment of the present invention, the substrate is in a form selected from the group consisting of a plate form, a granular form, and a powder form.

In an embodiment of the present invention, the region exposed to the laser beam may be melted to form the apatite coating inside the substrate in step (c).

In an embodiment of the present invention, the precursor solution may be selected from the group consisting of Dulbecco's Modified Eagle's Medium (DMEM), Human blood plasma (HBP), and simulated body fluid (SBF).

In an embodiment of the present invention, the precursor solution may be used by increasing concentrations of $Ca^{2+}$ ions and $PO_4^{3-}$ ions by 1 to 400 times.

In an embodiment of the present invention, the emitting of a laser beam may be performed by repeating a scanning process with the laser beam in one direction by a predetermined distance more than once.

In an embodiment of the present invention, the emitting of a laser beam may be performed by repeating a scanning process with the laser beam in a zigzag direction by a predetermined distance more than once.

In an embodiment of the present invention, an output power of the laser beam may be 100 $W/mm^2$ or more.

According to another aspect of the present invention, provided is an apparatus for forming an apatite coating including a precursor solution container configured to contain a precursor solution for forming apatite and providing an environment allowing the precursor solution to be in direct contact with a substrate, and a laser generator disposed to emit a laser beam onto a surface of the substrate through the precursor solution contained in the precursor solution container in a state where the precursor solution is in direct contact with the substrate.

In an embodiment of the present invention, the apparatus may further include a substrate receiving part on which the substrate is placed, wherein the precursor solution container has an opening at one or more positions allowing the precursor solution contained therein to be in direct contact with the substrate.

In an embodiment of the present invention, the opening of the precursor solution container may have a structure sealed by the substrate.

In an embodiment of the present invention, the apparatus may further include a substrate receiving part on which the substrate is placed, wherein the substrate receiving part is formed inside the precursor solution container.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views and some elements in the drawings may be exaggerated for descriptive convenience.

Hereinafter, embodiments of the present invention will be described in detail with reference to the accompanying drawings so that these embodiments may be readily implemented by those skilled in the art.

A method of forming an apatite coating according to an embodiment of the present invention includes (a) immersing a substrate in an apatite-forming precursor solution including $Ca^{2+}$ ions and $PO_4^{3-}$ ions, (b) emitting a laser beam onto a surface of substrate immersed in the precursor solution, and (c) forming an apatite coating in a region exposed to the laser beam, wherein an output power of the laser beam is set within a range enabling the surface of the substrate to be melted in step (b).

The substrate may be formed of a material allowing formation of an apatite coating on the surface, such as a metal, a ceramic, a polymer, or any composite material thereof which are available in living bodies. For example, the metal may include one selected from the group consisting of titanium (Ti), a Ti alloy, magnesium (Mg), a Mg alloy, stainless steel, and a cobalt (Co)-chromium (Cr) alloy. The ceramic may include one selected from the group consisting of zirconia, alumina, carbon ceramics, bioglass, tri-calcium phosphate (TCP), and calcium sulfate. The polymer may include one selected from the group consisting of polylactic acid (PLA), polyglycolic acid (PGA), poly D-lactic acid (PLDA), polyetheretherketone (PEEK), polycaprolactone (PCL), and ultra-high molecular weight polyethylene (UHMWPE). Also, any other metallic, a ceramic, or polymeric materials, or any composite materials thereof required for formation of an apatite coating may be used.

The substrate may be in a form selected from the group consisting of a plate form, a granular form, and a powder form. A size of the substrate in the form of a plate, granular, or powder form is not particularly limited as long as the substrate is immersed in the precursor solution.

The precursor solution is a solution that supplies a raw material for forming apatite and includes $Ca^{2+}$ ions and $PO_4^{3-}$ ions. For example, the precursor solution may be is selected from the group consisting of solutions including inorganic components such as Dulbecco's Modified Eagle's Medium (DMEM), Hank's balanced salt solution (HBSS), and human blood plasma (HBP), and simulated body fluid (SBF). The precursor solution may be used by increasing concentrations of $Ca^{2+}$ ions and $PO_4^{3-}$ ions by 1 to 400 times to promote formation of apatite. However, the present invention is not limited thereto, and any precursor solution may be used as long as the concentration of the precursor solution is adjustable according to the purpose of synthesis.

For example, when Dulbecco's Modified Eagle's Medium (DMEM) is used as the precursor solution, apatite is formed on the surface of the substrate via a reaction represented by Formula 1 below using a laser beam as an energy source.

$$6H_3PO_4(aq) + 10Ca(OH)_2(aq) \rightarrow Ca_{10}(PO_4)_6(OH)_2(s) + 18H_2O(l) \qquad <\text{Formula 1}>$$

A coating area, a coated shape, a thickness, and the like of the apatite formed on the surface of the substrate may be modified by adjusting conditions of the laser beam, e.g., power, frequency, pulse width, scanning method, scan speed, and the like of the laser beam.

For example, apatite may be formed over the entire surface of the substrate by scanning the entire surface of the substrate using a laser beam. As another example, apatite may be locally formed on a predetermined region of the substrate by emitting a laser beam onto the predetermined region of the substrate or scanning the predetermined region.

As another example, apatite having a desired pattern may be formed by forming apatite over the entire region of the substrate using the above-described method and then removing apatite formed at a predetermined region by directly emitting a laser beam onto the region without passing through the precursor solution.

When the surface of the substrate immersed in the precursor solution is exposed to a laser beam having a high energy, reactions of $Ca^{2+}$ ions and $PO_4^{3-}$ ions contained in the precursor solution are activated, thereby forming the apatite coating. In an embodiment, when a metallic or ceramic substrate is exposed to a laser beam having an energy of 100 $W/mm^2$ or higher, the surface of the substrate is melted and apatite penetrates into the substrate to be fused with a material constituting the substrate in a melt-mixed state. Since apatite nuclei are formed in the melted substrate and grow into crystals, a coating layer in which the substrate and apatite are mixed is formed in a short time. On the contrary, when a laser beam having a low energy less than 100 $W/mm^2$ is applied to the metallic or ceramic substrate, the metallic or ceramic material is not melted, and thus an apatite coating is formed only on the surface of the substrate. In another embodiment, the surface of the polymeric substrate may be melted even by a relatively low output power of a laser beam less than 100 $W/mm^2$. According to an embodiment of the present invention, binding strength of the coating is increased compared to binding strength of conventional spray coating or dip coating by exposing the surface of the substrate to a laser beam having an energy capable of melting the surface of the substrate.

An apparatus for forming an apatite coating according to an embodiment of the present invention includes a precursor solution container configured to contain a precursor solution for forming apatite, and a laser generator configured to generate a laser beam passing through the precursor solution contained in the precursor solution container.

The precursor solution container provides an environment where the precursor solution is in direct contact with the substrate on which apatite is to be formed in a state of being immersed in the precursor solution.

Figure 3A:
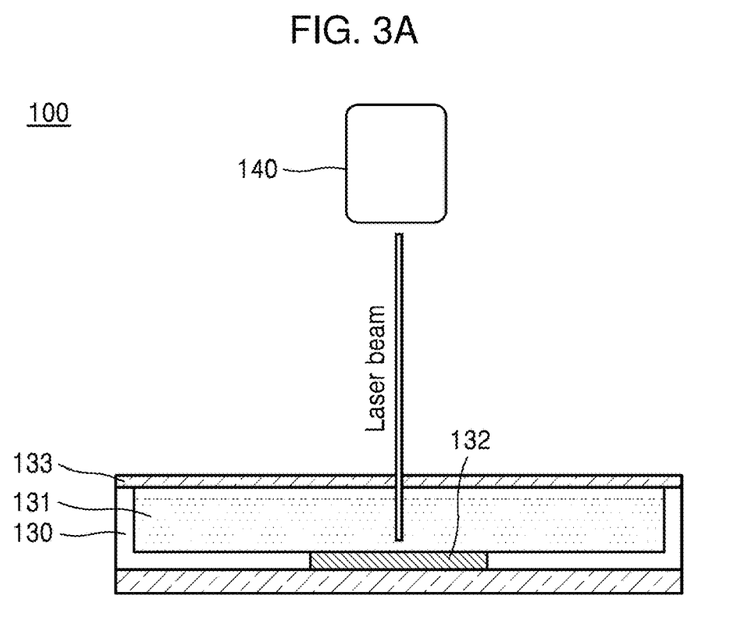
FIGS. 3A and 3B schematically illustrates apparatuses for forming an apatite coating according to an embodiment.

FIG. 3A illustrates an apparatus of forming an apatite coating according to an embodiment. Referring to FIG. 3A, an apatite coating forming apparatus 100 includes a vessel-shaped precursor solution container 130 and a laser generator 140 capable of emitting a laser beam from above the precursor solution container 130. The precursor solution container 130 may contain a precursor solution 131. Since the precursor solution container 130 is in the form of a vessel, a substrate 110 may be placed in the vessel and fixed thereto. When the precursor solution 131 is added to the precursor solution container 130 and the substrate 110 is fixed therein, an environment in which the precursor solution is in direct contact with the substrate 110 is provided.

In this regard, a substrate receiving part 132 on which the substrate 110 is placed may be provided at one portion of the precursor solution container 130. Although FIG. 3 shows the substrate receiving part 132 in the form of a groove on which the substrate 110 is mounted and fixed, the present invention is not limited thereto and any structure capable of stably accommodating the substrate 110 may be applicable thereto.

Optionally, a portion of the precursor solution container 130 may be open to allow a laser beam to pass therethrough or may be provided with a window 133 formed of a transparent material capable of transmitting the laser beam therethrough.

The laser generator 140 is a device configured to emit a laser beam onto a region where the precursor solution 131 is in contact with the substrate 110. When the laser beam with a high energy is emitted onto the region where the precursor solution 131 is in contact with the substrate 110, reactions of $Ca^{2+}$ ions and $PO4^{3-}$ ions contained in the precursor solution 131 are activated to form an apatite layer on the surface of the substrate 110 or inside the substrate 110. In this sense, the laser generator 140 may be a component serving as an energy source for supplying energy for forming apatite.

As the laser generator 140, for example, an ytterbium nanosecond pulsed or femtosecond pulsed laser generator. In this regard, the nanosecond pulsed laser refers to a laser having a short pulse width of $10^{-9}$ seconds with a pulse time of several nanoseconds, and the femtosecond pulsed laser refers to a laser having a very short pulse width of $10^{-15}$ seconds. However, the present invention is not limited thereto, and any laser capable of supplying sufficient energy to the precursor solution to form apatite may also be used.

Figure 3B:
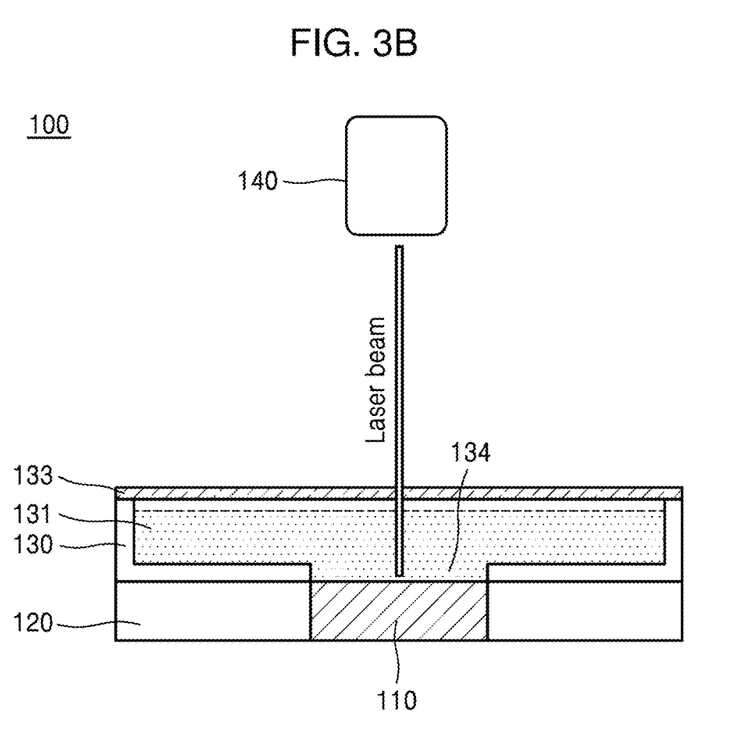

FIG. 3B illustrates an apparatus for forming an apatite coating according to another embodiment of the present invention.

Referring to FIG. 3B, an apatite coating forming apparatus 100 includes a substrate 110, a substrate receiving part 120, a precursor solution container 130, and a laser generator 140. In the present embodiment, the substrate 110 and the substrate receiving part 120 are disposed outside the precursor solution container 130. The substrate receiving part 120 supports the substrate 110 to fix the substrate 110 to a predetermined position during laser processing.

In the present embodiment, the precursor solution container 130 has an opening 134 at one portion such that the precursor solution 131 contained therein may be in direct contact with the substrate 110, and an environment for direct contact between the precursor solution 131 and the substrate 110 is provided by the opening 134. The surface of the substrate 110 in direct contact with the precursor solution 131 contained in the precursor solution container 130 constitutes a region exposed to the laser beam. According to the present embodiment, the precursor solution 131 is locally in direct contact with the substrate 110 through the opening 134.

Optionally, a part of the precursor solution container 130 may be open to allow the laser beam to pass therethrough or may be provided with a window 133 formed of a transparent material capable of transmitting the laser beam therethrough.

Hereinafter, a method of forming apatite on the substrate 110 will be described with reference to the apatite coating forming apparatus 100 illustrated in FIG. 3B.

After the substrate 110 is fixed at a predetermined position using the substrate receiving part 120, the precursor solution container 130 is filled with the precursor solution 131. In this case, the precursor solution 131 needs to be in direct contact with the surface of the substrate 110 through an open surface of the bottom of the precursor solution container 130.

Subsequently, an apatite coating is formed on the surface of the substrate 110 by emitting a laser beam onto the region of the substrate 110 in direct contact with the precursor solution 131 using the laser generator 140. In this case, the laser beam generated by the laser generator 140 passes through the precursor solution 131 and arrives at the surface of the substrate 110.

By emitting the laser beam to the precursor solution 130, energy is applied to the precursor solution 130, resulting in formation of apatite on the surface of the substrate 110 and inside the substrate 110.

Hereinafter, the present invention will be described in more detail with reference to the following examples. However, these examples are made only for illustrative purposes, and the present invention is not be construed as being limited to those examples.

Example 1

An apatite coating forming apparatus as illustrated in FIG. 3B was fabricated. A substrate in a plate form formed of a titanium alloy of Ti-6Al-4V as a base material. As a substrate receiving part was manufactured in a mold form in which the substrate was able to be seated using PDMS. The substrate was fixed to the PDMS mold. DMEM concentrated to 100 to 400 times was added to the precursor solution container provided on the PDMS mold to which the substrate was fixed. Then, the surface of the substrate was scanned by a laser beam using a ytterbium nanosecond pulsed fiber laser to form an apatite coating on the surface of the substrate. A power of the laser beam was selected form a range of 0 to 3539 $W/mm^2$ and a scan speed was selected from a range of 100 to 1000 mm/s.

EXPERIMENTAL EXAMPLES

Experimental Example 1

Figure 1:
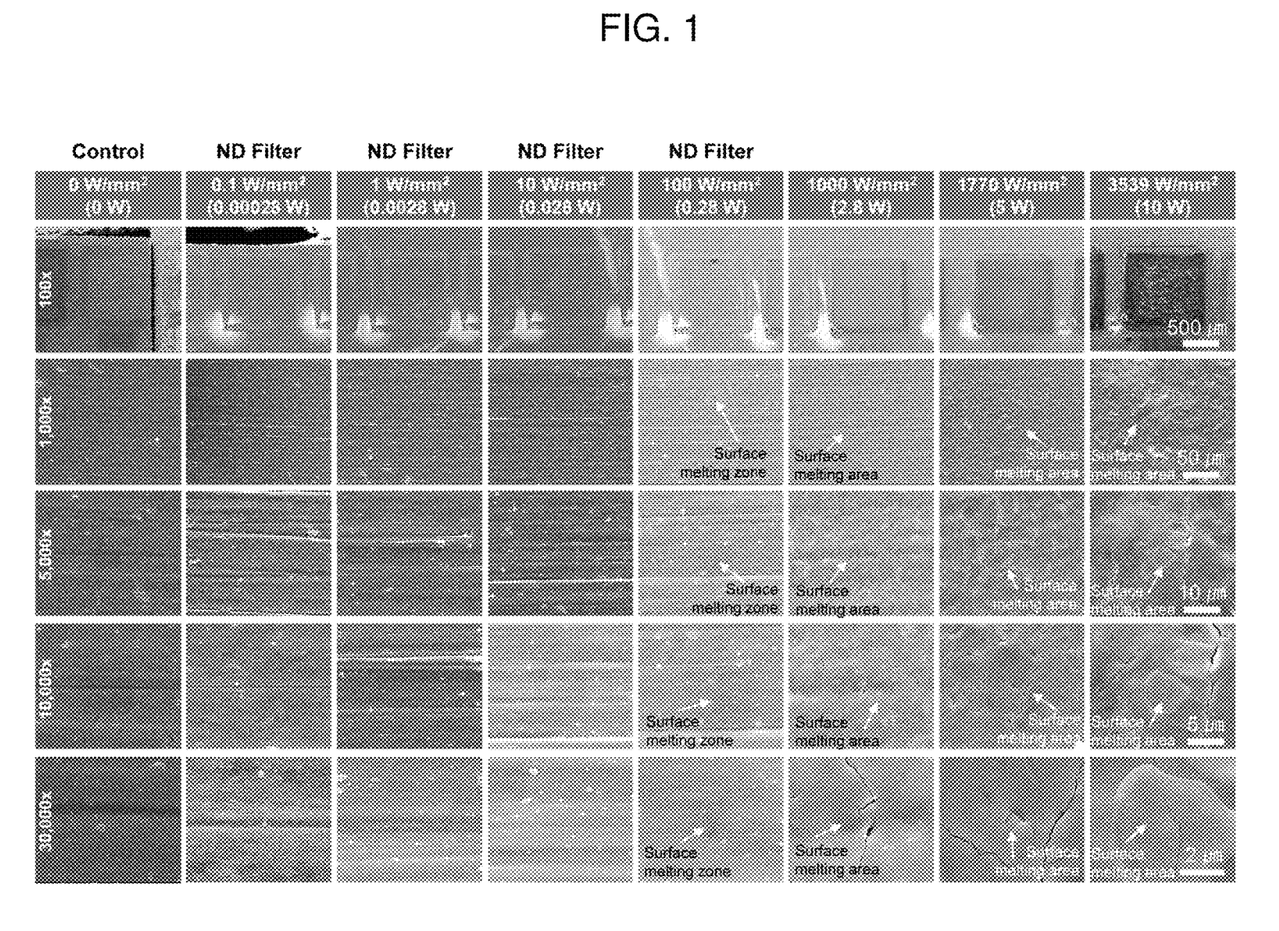
FIG. 1 shows electron microscope images illustrating changes in the surface of a substrate according to output power of a laser according to an embodiment.
Figure 2:
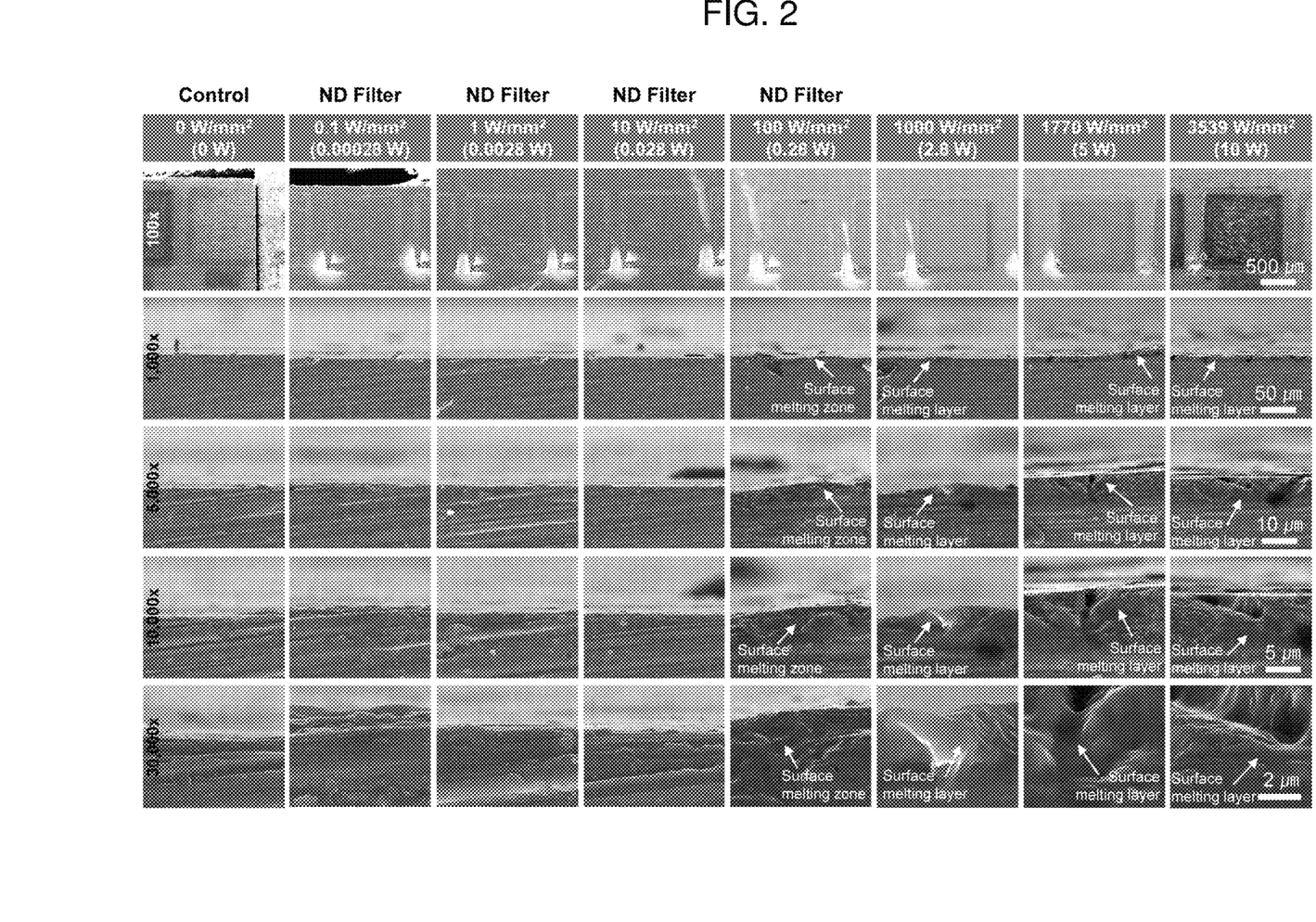
FIG. 2 shows electron microscope images illustrating changes in the cross-section of a substrate according to output power of a laser according to an embodiment.

FIGS. 1 and 2 are electron microscope images of surfaces and cross-sections of a titanium substrate exposed to a laser beam in a state of being immersed in distilled water to identify formation of a melting layer according to output power of a laser. Referring to FIG. 1, while scratches formed during polishing of a sample remained intact at an output power less than 100 $W/mm^2$, as under the same conditions at an output power of 0 $W/mm^2$ where a laser beam was not used, it was confirmed that scratches on the surface of the substrate began to melt and disappear at an output power of 100 $W/mm^2$ or higher according to an embodiment of the present invention and a wave pattern was formed as the surface melted at an output power of 1000 W/mm² or higher. Referring to cross-sectional images of the substrate shown in FIG. 2, no surface changes were observed at an output power less than 100 W/mm² as under the same conditions at an output power of 0 W/mm² where a laser beam was not used. On the contrary, it was confirmed that the substrate sample melted (30,000× magnification) and a relatively dark gray melting layer was formed (1,000× magnification) at an output power of 100 W/mm² or higher according to an embodiment of the present invention. That is, based on the analysis of the surfaces and cross-sections of the substrate, it was confirmed that surface of the substrate did not melt at a low output power of the laser but melted at an output power of 100 W/mm² or higher.

Experimental Example 2

Figure 4A:
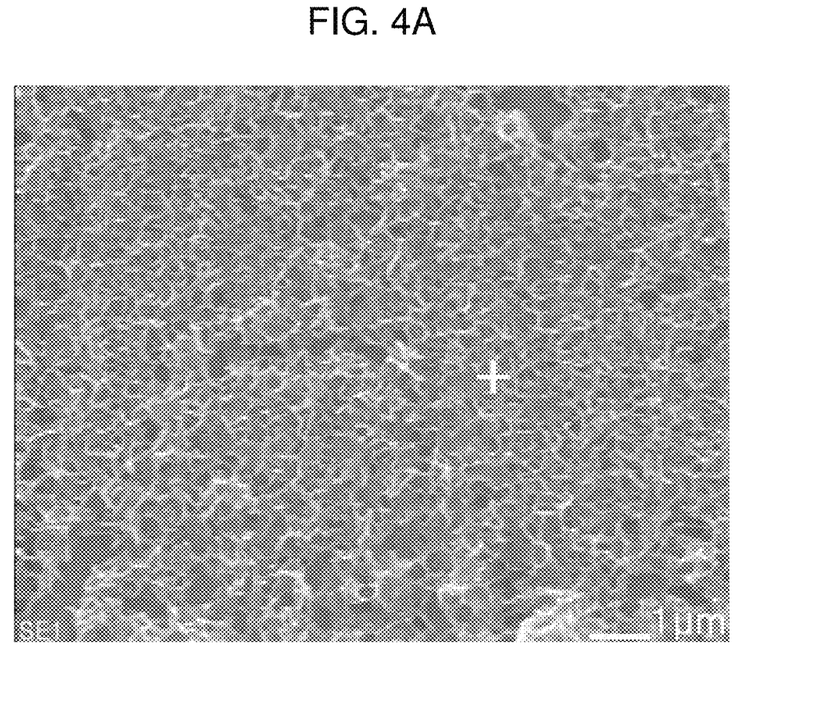
FIGS. 4A and 4B show a scanning electron microscope (SEM) image of apatite according to an embodiment and composition analysis results thereof by energy dispersive spectrometry (EDS)
Figure 4B:
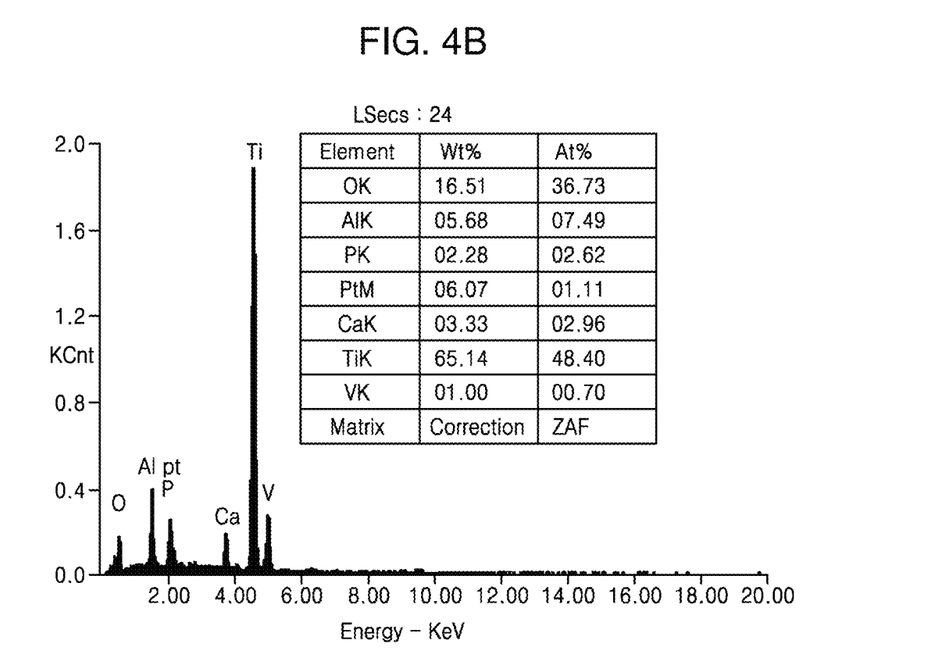

FIG. 4 shows a scanning electron microscope (SEM) image of apatite formed on the surface of the substrate according to Example 1 and composition analysis results thereof by energy dispersive spectrometry (EDS).

First, referring to FIG. 4A, it may be confirmed that a coating having a porous structure is formed on the surface of the titanium alloy used as the substrate. Referring to FIG. 4B, peaks of Ca and P are identified as a result of composition analysis of a product by EDS, indicating that apatite is formed on the surface of the substrate.

Figure 5A:
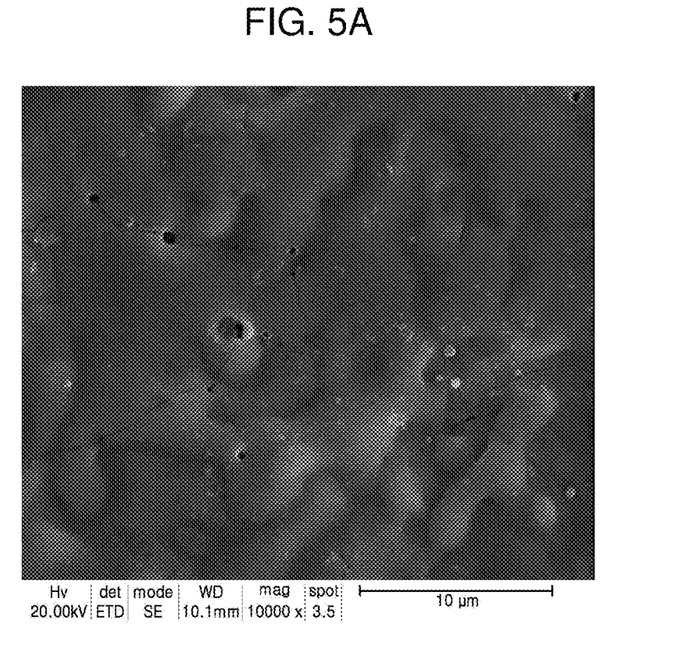
FIGS. 5A and 5B show SEM images indicating changes in surface morphology (roughness and pores) of titanium with respect to the repetition number according to an embodiment.
Figure 5B:
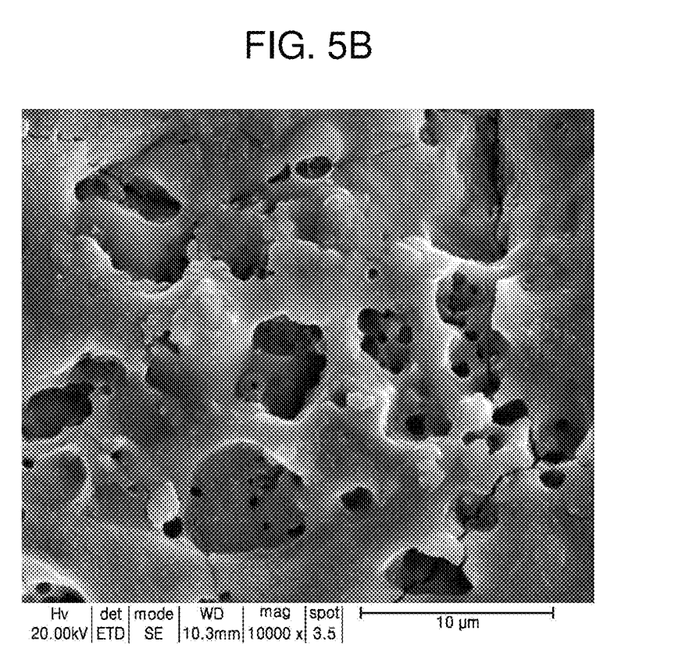

FIGS. 5A and 5B show SEM images indicating changes in surface morphology (roughness and pores) of titanium according to the repetition number (100 times and 300 times) of laser beam emission according to an embodiment.

Referring to FIGS. 5A and 5B, it may be confirmed that pores are formed by repeated melting and solidification of the surface of titanium as the repetition number of the laser beam emission increases.

Figure 6:
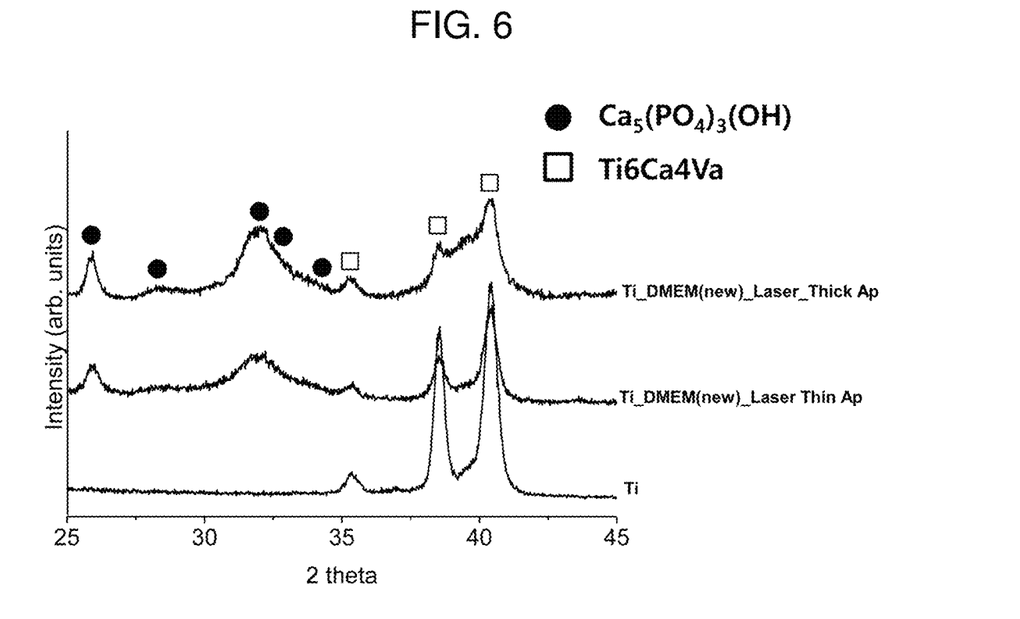
FIG. 6 shows results of X-ray diffraction (XRD) measurement of apatite according to an embodiment.

FIG. 6 shows results of X-ray diffraction (XRD) measurement of apatite formed on the surface according to Example 1, and it may be confirmed that X-ray diffraction peaks corresponding to hydroxyapatite ($Ca_5(PO_4)_3(OH)$) are observed. Thus, as described above, it may also be confirmed that the surface layer formed on the titanium alloy substrate is formed of a hydroxyapatite phase.

Figure 7A:
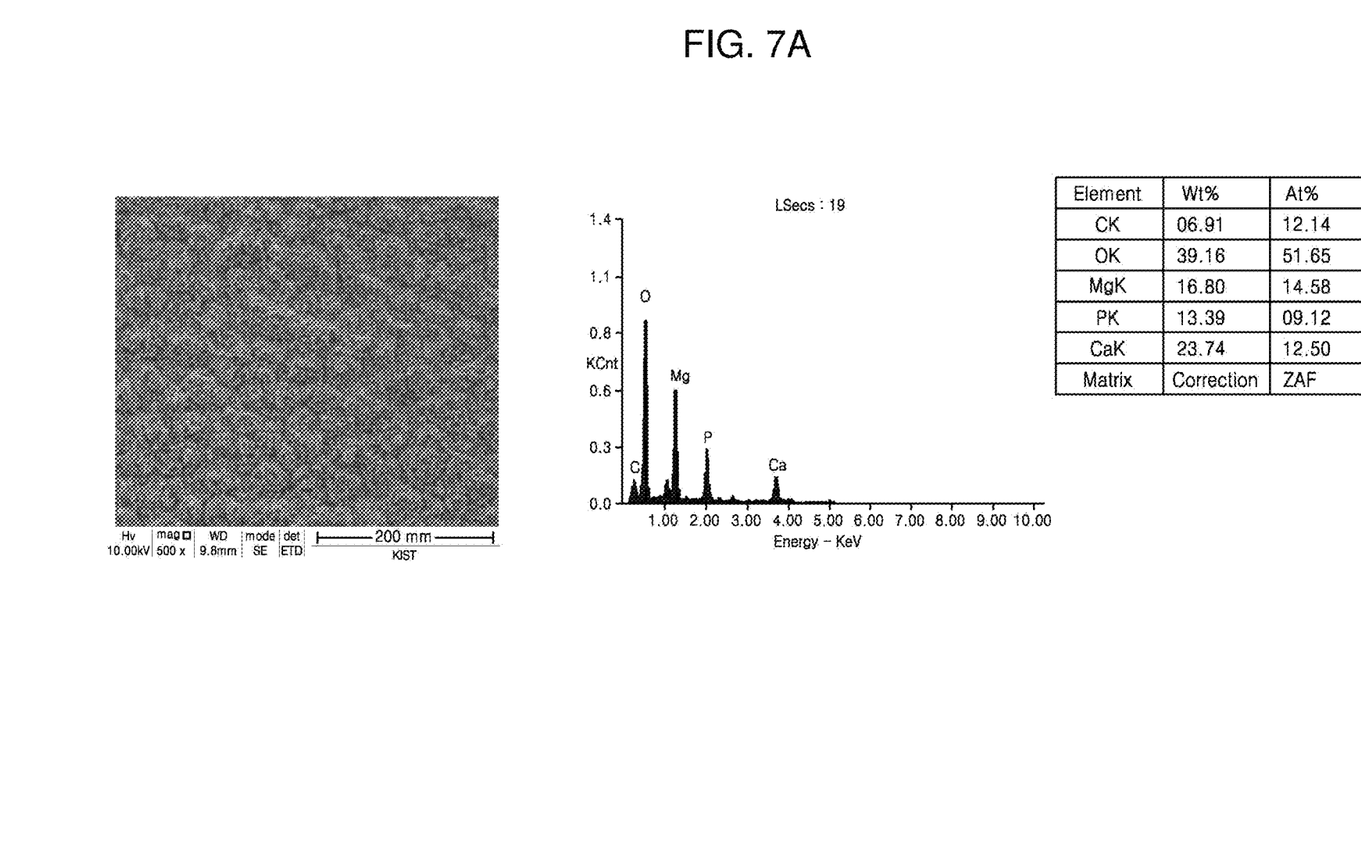
FIGS. 7A and 7B show SEM images of apatite formed on an magnesium substrate and EDS results according to an embodiment.
Figure 7B:
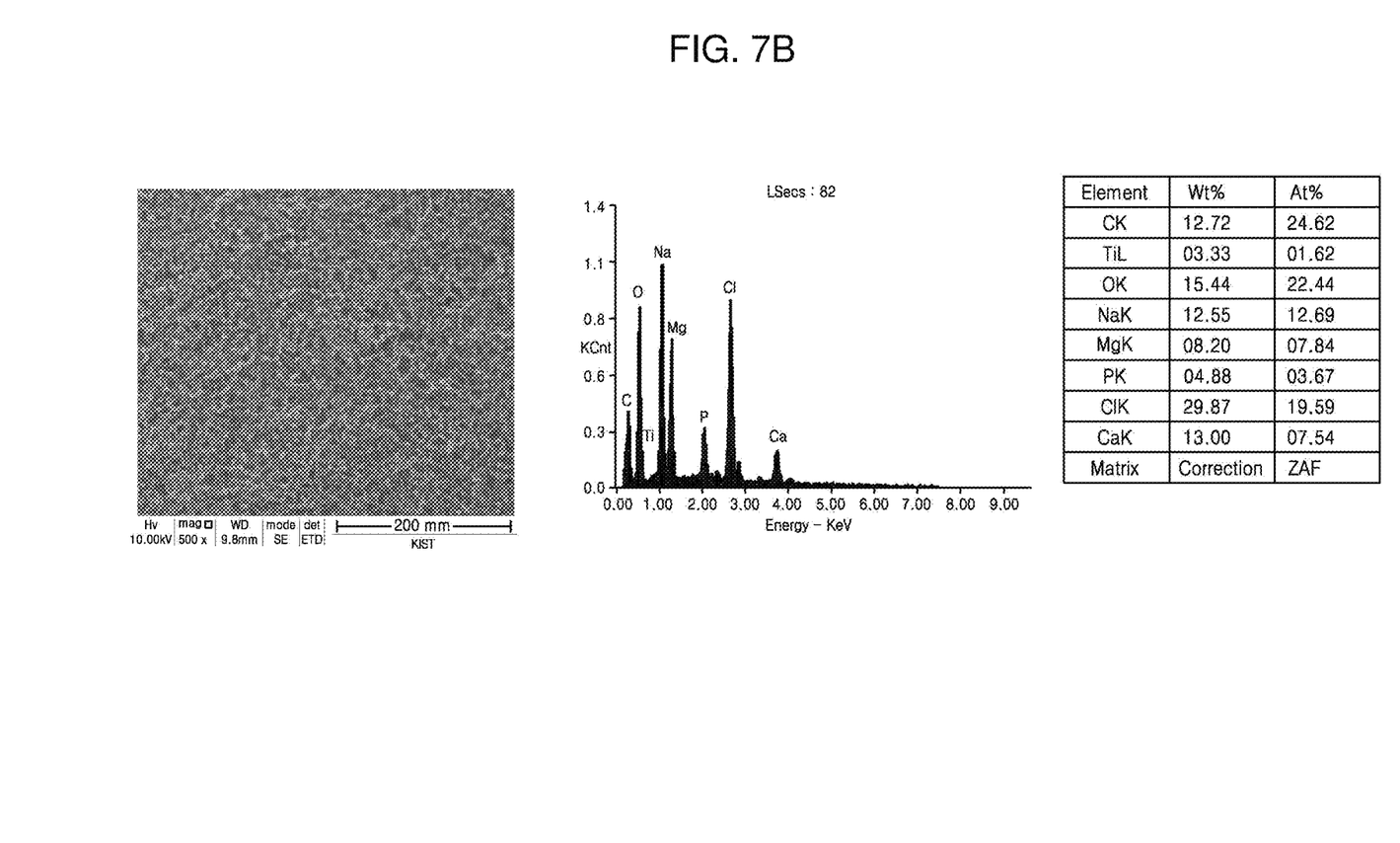

Apatite was formed on the surface of the substrate in the same manner as in the Example 1 above except that a magnesium alloy substrate was used, and analysis results thereof are shown in FIG. 7A shows an SEM image of apatite and composition analysis results thereof by EDS when the output power of the laser beam is 100 W/mm², and FIG. 7B shows an SEM image of apatite and composition analysis results thereof by EDS when the output power of the laser beam is 184 W/mm².

Referring to FIGS. 7A and 7B, peaks of Ca and P are identified as a result of analyzing a material formed on the surface of the magnesium alloy substrate by EDS. Based thereon, it may be confirmed that an apatite layer is formed on the surface of the magnesium alloy substrate. Therefore, it may be confirmed that apatite is stably formed on the surface of the magnesium alloy substrate as well as on the titanium alloy substrate.

Experimental Example 3

Figure 8A:
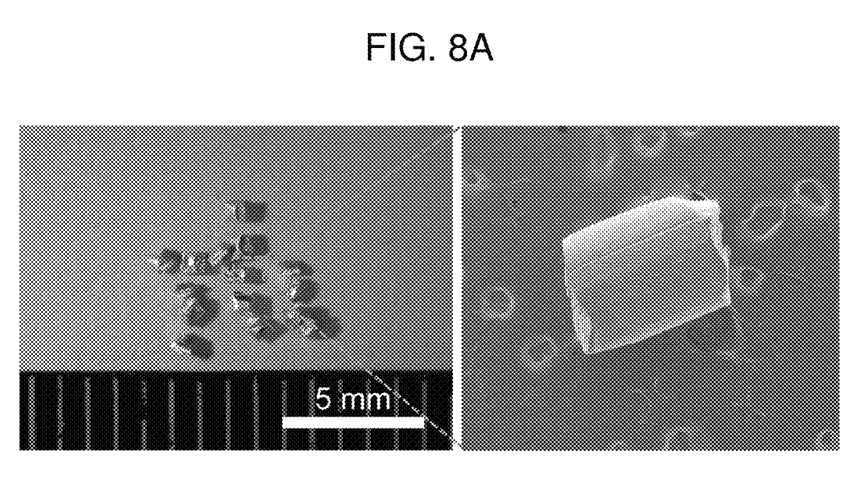
FIGS. 8A and 8B show optical microscope images and electron microscope images of a substrate in a granular form according to an embodiment and a powder form used to form an apatite coating.
Figure 8B:
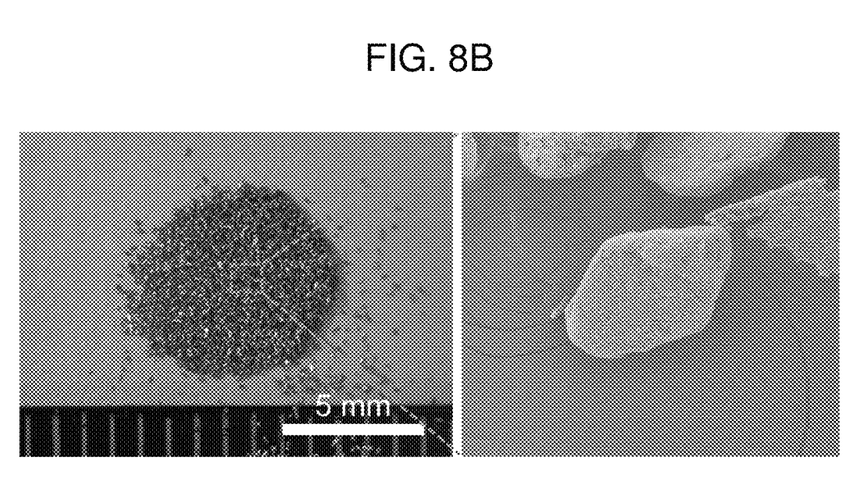

FIG. 8A shows optical microscope images and electron microscope images of a metallic substrate in a granular form and FIG. 8B shows optical microscope images and electron microscope images of a metallic substrate in powder form before forming apatite. Although apatite coatings are generally formed on substrates in a plate form, an apatite coating may also be formed on a sample in the form of a plate and granules as well as on a sample in the form of powder according to the method of forming an apatite coating according to an embodiment of the present invention.

Figure 9A:
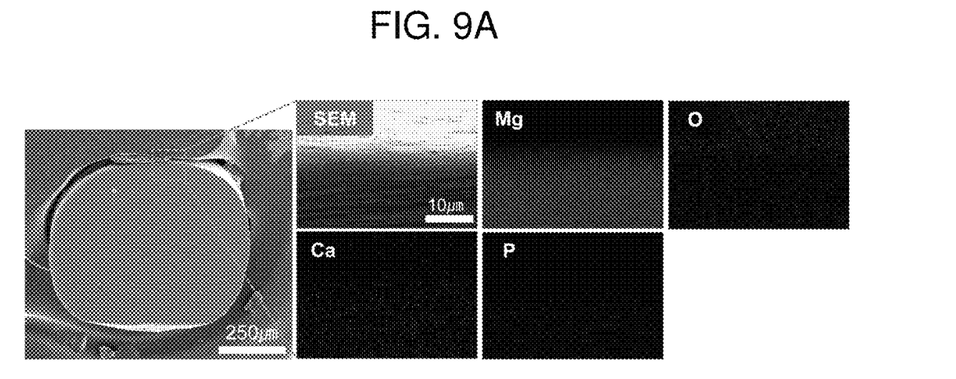
FIGS. 9A and 9B show SEM images of a substrate in a granular form according to an embodiment before and after forming an apatite coating thereon and EDS results.
Figure 9B:
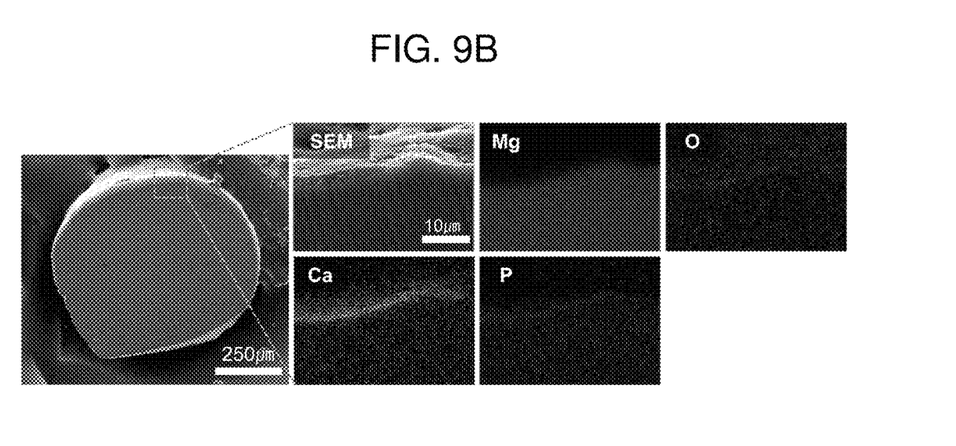

FIGS. 9A and 9B show SEM images of an apatite coating formed on a substrate in a granule form having a size of 300 µm to 1000 µm and composition analysis results thereof by EDS. Although appearances of cross-sections of the samples looked similar in the SEM images, 'Ca' and 'P' components were not detected in the sample (in FIG. 9A) which was not treated with a laser in composition analysis by EDS, but both 'Ca' and 'P' components were detected in the sample (in FIG. 9B) in which an apatite coating was formed on the surface using a laser indicating that the apatite coating was properly formed on the surface of the substrate.

Figure 10A:
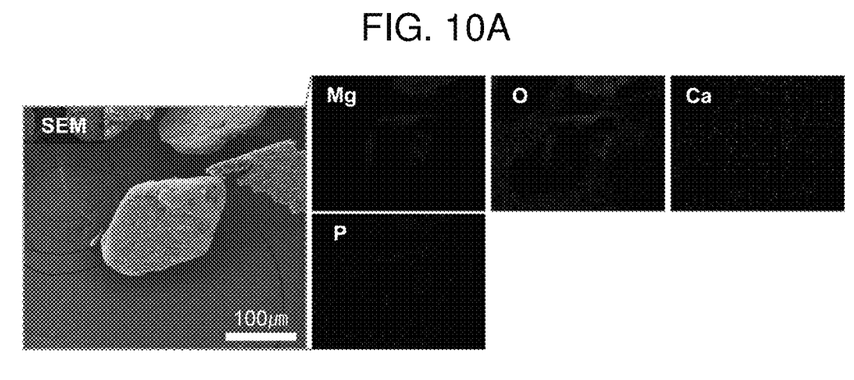
FIGS. 10A and 10B show SEM images of a substrate in a powder form according to an embodiment before and after forming an apatite coating thereon and EDS results.
Figure 10B:
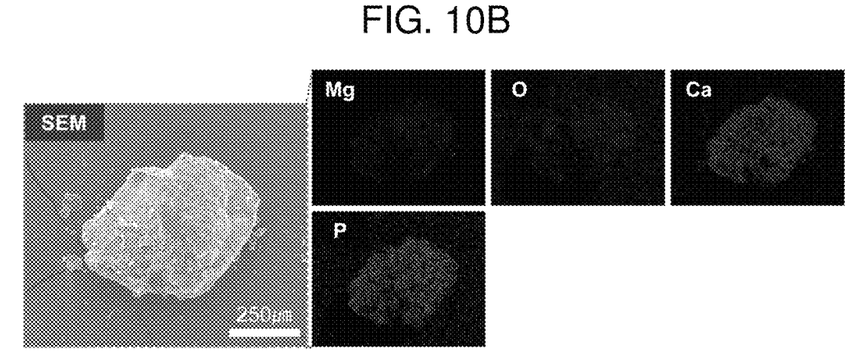

FIGS. 10A and 10B show SEM images of an apatite coating formed on a substrate in a powder form having a size of 10 µm to 300 µm and composition analysis results thereof by EDS. Although appearances of the surfaces of the samples looked similar in the SEM images, 'Ca' and 'P' components were not detected in the sample (in FIG. 10A) which was not treated with a laser in composition analysis by EDS, but both 'Ca' and 'P' components were detected in the sample (in FIG. 10B) in which an apatite coating was formed on the surface using a laser indicating that the apatite coating was properly formed on the surface of the substrate.

Experimental Example 4

Laser beam emission was also performed to identify whether an apatite coating is formed on a polymeric substrate as well as on the metallic substrate, and the results are shown in FIGS. 12 to 15.

Figure 11A:
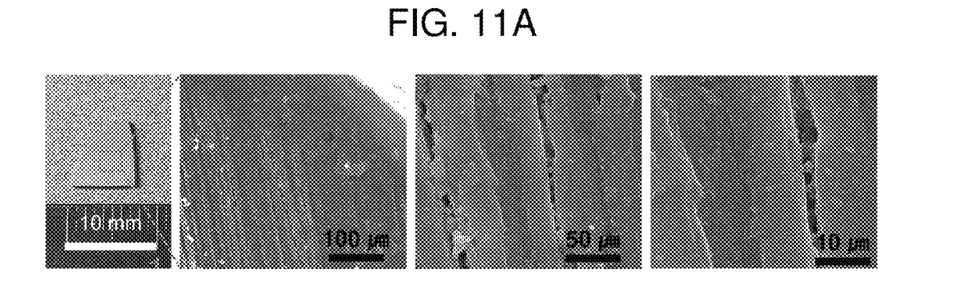
FIGS. 11A and 11B show results of analyzing the surface of a polymeric substrate according to an embodiment before and after forming an apatite coating using an optical microscope and an electron microscope.
Figure 11B:
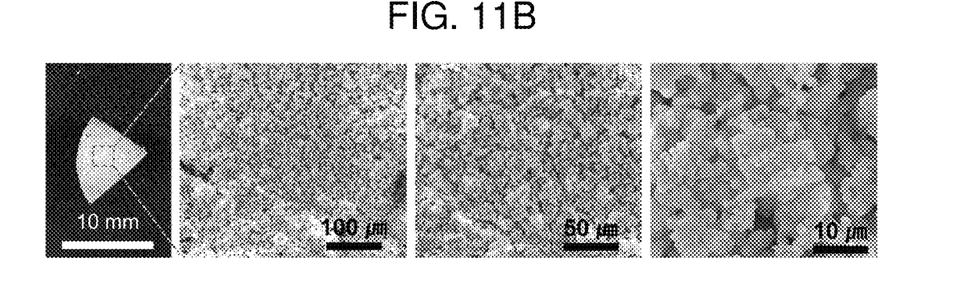

FIGS. 11A and 11B show results of analyzing the surface of an apatite coating formed on a polymeric sample of polyetheretherketone (PEEK) before and after forming the apatite coating using a laser using an optical microscope and an electron microscope. It is confirmed that an apatite coating layer is properly formed after surface treatment using a laser.

Figure 12:
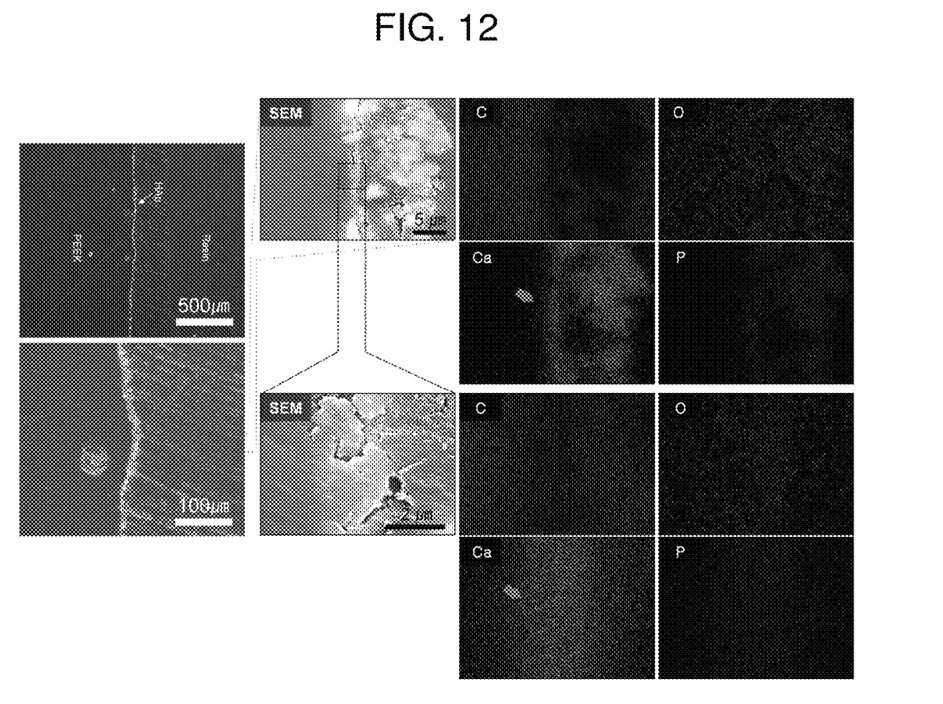
FIG. 12 shows results of analyzing the cross-section of an apatite coating formed on a polymeric substrate according to an embodiment after forming the apatite coating by SEM and EDS.

FIG. 12 shows results of analyzing the cross-section of an apatite coating formed on the polymeric sample of polyetheretherketone (PEEK) after forming the apatite coating using an electron microscope and EDS. As a result of composition analysis (color images on the right), in electron microscope images (upper and lower images on the left) shown as relatively brighter band shapes, 'Ca' and 'P' were detected indicating that an apatite coating was formed. In addition, since the apatite coating layer was not only stacked on the surface of the substrate but also detected inside the substrate (shown as red dotted line), it was confirmed that an apatite melt-mixed layer (apatite coating formed on the surface and penetrating into the substrate), which was identified in the above-described metallic substrate, may also be formed by the melted surface layer.

Figure 13A:
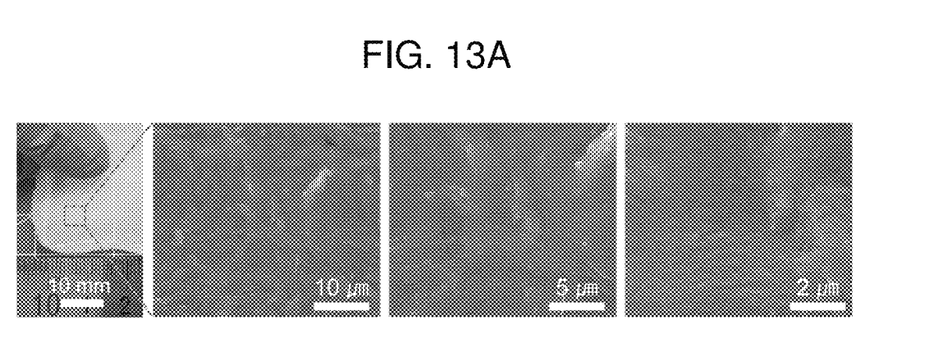
FIGS. 13A and 13B show results of analyzing the surface of a polymeric substrate according to an embodiment before and after forming an apatite coating thereon.
Figure 13B:
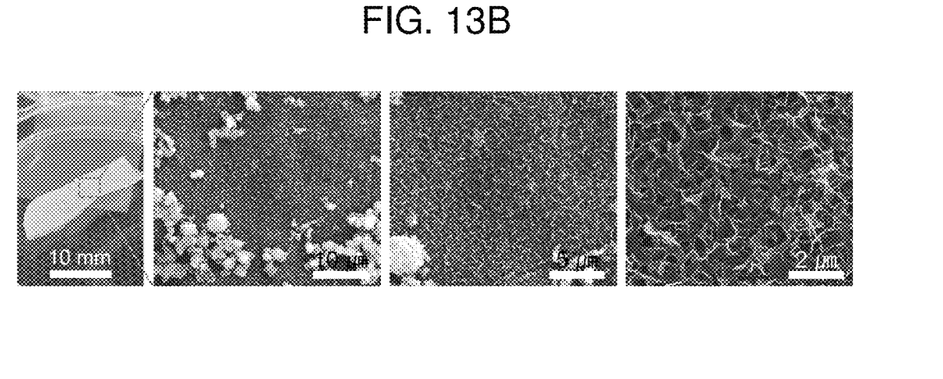

FIGS. 13A and 13B show surface analysis results before and after forming an apatite coating on a polymeric substrate of polycaprolactone (PCL). It is confirmed that an apatite coating layer is properly formed on the surface of PCL after surface treatment using a laser.

Figure 14:
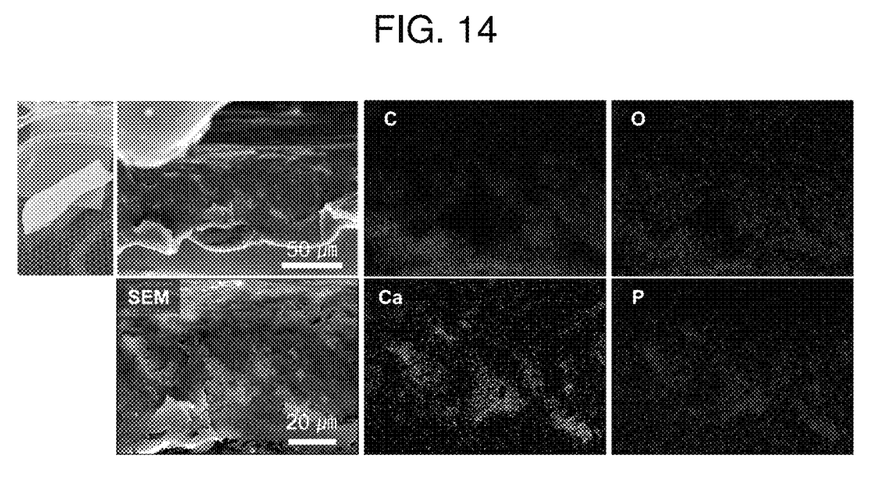
FIG. 14 shows results of analyzing the cross-section of a polymeric substrate according to an embodiment after forming an apatite coating thereon by SEM and EDS.

FIG. 14 shows results of analyzing the cross-section of a PCL polymeric sample after forming an apatite coating thereon using a laser, by an optical microscope (upper on the left), an electron microscope, and EDS. In SEM images, 'C' was detected in a relatively dark region and 'Ca' and 'P' were detected in relatively bright regions. This indicates that apatite was mixed with PCL used as the substrate and shows that a melt-mixed layer, in which the apatite coating is not only stacked on the surface of the substrate but also penetrates into the substrate, was formed. This also indicates that an apatite melt-mixed layer (apatite coating penetrates into the substrate as well as being formed on the surface), which was identified in the above-described metallic substrate, may also be formed by the melted surface layer using a different type of polymer.

According to an embodiment of the present invention as described above, the apatite coating is uniformly formed on the surface of the substrate and binding strength of the coating is maximized by emitting a laser beam onto the surface of the substrate immersed in the precursor solution.

However, these problems are exemplary and the scope of the present invention is not limited thereby.

While one or more embodiments of the present invention have been described with reference to the drawings, it will be understood by those of ordinary skill in the art that various changes in form and details may be made therein without departing from the spirit and scope of the present invention as defined by the following claims.

What is claimed is:

1. A method of forming an apatite coating, the method comprising:
    (a) immersing a substrate in a precursor solution including $Ca^{2+}$ ions and $PO_4^{3-}$ ions for forming apatite;
    (b) exposing a region of a surface of the substrate immersed in the precursor solution to a laser beam; and
    (c) forming an apatite coating in the region of the surface exposed to the laser beam in step (b),
    wherein an output power of the laser beam is set to 100 $W/mm^2$ to less than 1770 $W/mm^2$ to melt the region of the surface of the substrate exposed to the laser beam in step (b) and
    wherein apatite in the apatite coating at step (c) penetrates into the melted surface of the substrate and is fused with material constituting the substrate to form a melt-mixed layer in which the substrate and apatite are mixed.

2. The method of claim 1, further comprising (d) removing the precursor solution and then removing a part of the apatite coating by emitting a laser beam to the region where the apatite coating is formed after step (c).

3. The method of claim 1, wherein the substrate comprises at least one material selected from the group consisting of a metal, a ceramic, a polymer, and a combination thereof.

4. The method of claim 3, wherein the metal comprises one selected from the group consisting of titanium (Ti), a Ti alloy, magnesium (Mg), a Mg alloy, stainless steel, and a cobalt (Co)-chromium (Cr) alloy.

5. The method of claim 3, wherein the polymer comprises one selected from the group consisting of polylactic acids (PLA), polyglycolic acid (PGA), poly D-lactic acid (PLDA), polyetheretherketone (PEEK), polycaprolactone (PCL), and ultra-high molecular weight polyethylene (UHMWPE).

6. The method of claim 1, wherein the substrate is in a form selected from the group consisting of a plate form, a granular form, and a powder form.

7. The method of claim 1, wherein the precursor solution is selected from the group consisting of Dulbecco's Modified Eagle's Medium (DMEM), Human blood plasma (HBP), and simulated body fluid (SBF).

8. The method of claim 1, wherein prior to step (a) the precursor solution is concentrated by 1 to 400 times.

9. The method of claim 1, wherein the emitting of a laser beam is performed by repeating a scanning process with the laser beam in one direction by a predetermined distance more than once.

10. The method of claim 1, wherein the emitting of a laser beam is performed by repeating a scanning process with the laser beam in a zigzag direction by a predetermined distance more than once.

11. The method of claim 1 wherein the substrate comprises at least one material selected from the group consisting of stainless steel, cobalt (Co)-chromium (Cr) alloy, a polymer, or any composite material thereof.

* * * * *